Oct. 29, 1968  G. PERKINS, JR., ET AL  3,407,574
CHROMATOGRAPHY APPARATUS
Filed April 8, 1966  2 Sheets-Sheet 1

INVENTORS
GERALD PERKINS JR,
DONALD J. HAASE &
BY JOHN M. CRAWFORD

ATTORNEY

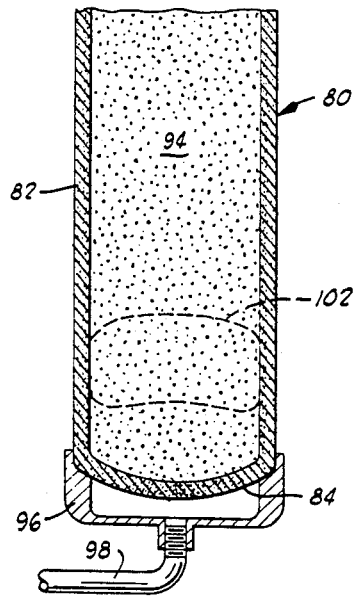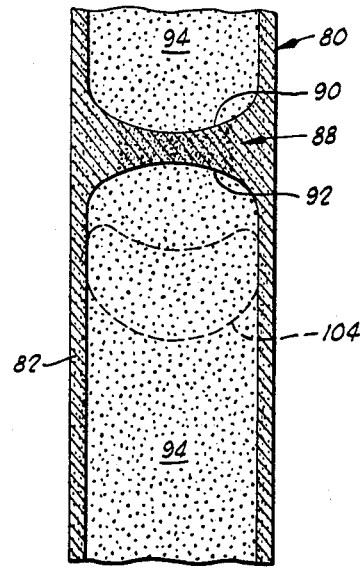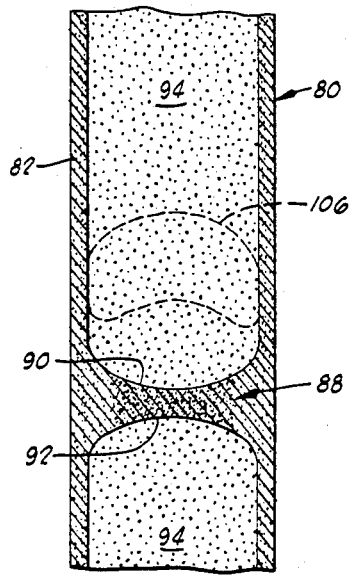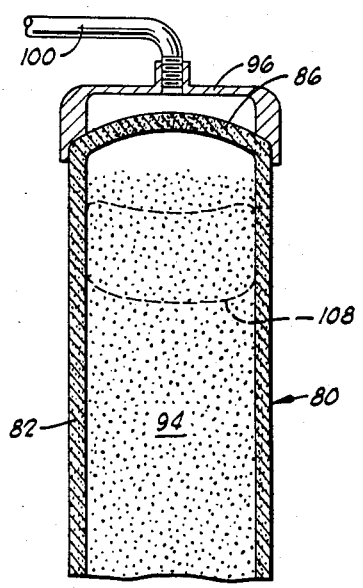

United States Patent Office 3,407,574
Patented Oct. 29, 1968

3,407,574
CHROMATOGRAPHY APPARATUS
Gerald Perkins, Jr., Donald J. Haase, and John M. Crawford, Ponca City, Okla., assignors to Continental Oil Company, Ponca City, Okla., a corporation of Delaware
Filed Apr. 8, 1966, Ser. No. 541,170
14 Claims. (Cl. 55—386)

ABSTRACT OF THE DISCLOSURE

A chromatographic column containing a gradient-correcting device comprising a porous member in the column transverse to the fluid flow, the pressure drop across the central region of the member being substantially less than that of outer regions thereof.

---

This invention relates to chromatography apparatus, and more particularly, to improved gas chromatography columns used to effect the separation of some or all of the components of the gaseous mixture. In one aspect, the invention also relates to component concentration profile reshaping structures adapted to be located within chromatographic columns and to function in such location to exert a shaping influence upon bands or zones of separated components moving through the column.

In gas chromatography, a gaseous mixture of interest is moved through a packed column by means of a carrier gas, and due to the selective adsorption characteristics of the packing material, the mixture is separated into a plurality of components, which may correspond to the several individual molecular species making up the gaseous mixture, or to combinations of these species constituting less than the whole mixture. As the components are separated in the column by the packing material, they tend to move through the column as substantially segregated, individually identifiable bands or zones in each of which the separated component is present in the carrier gas in a high concentration. It is desirable in the chromatographic procedure that these high concentration zones be as geometrically symmetrical, and as sharply separated from each other, as possible.

In most gas chromatographic columns, as presently constructed, optimum profile geometry of component concentration zones is not attained. Rather, the component concentration profiles tend to have protuberant portions or concavities which permit undesirable overlap of the bands, or which yield other results which detract from the accuracy of chromatographic analysis, or from the overall efficiency of columns used for preparative purposes. A number of effects inherent in column construction and operation tend to promite or contribute to such undesirable distortion of component concentration profiles, including, among others, wall effect, thermal gradients across the column, and channeling and uneven porosity of the column packing. In the case of many of these effects, their profile distorting influence increases as the cross-sectional size of the chromatographic column increases.

The present invention comprises improved chromatographic apparatus which functions to counteract the component concentration profile distorting influence attributable to the described effects. Broadly described, the invention comprises a component concentration profile reshaping structure for inclusion in a chromatographic column across the path of gas flow therethrough, said structure comprising a porous, consolidated particle matrix having a non-uniform resistance to gas flow in a direction through the matrix normal to the direction of gas flow through the column. More specifically, the invention comprises a porous matrix of small solid particles consolidated by the use of a bonding or adhesive agent, the matrix being dimensioned to fit within a chromatographic column and to extend a major portion of the transverse distance across the column normal to the direction of gas flow therethrough. The geometric configuration and porosity of the matrix are predetermined to provide a desired profile shaping action as a result of offering more resistance to gaseous flow in one portion of the column cross-section than in another. In this way, undesirable component concentration profile distortion resulting from wall effect or other inherent column conditions can be counteracted.

In a preferred construction of the described consolidated particle matrix, the solid particles employed are a siliceous material, such as sand, and the consolidating agent utilized is sodium silicate to yield a simulated porous sandstone having properties which make it especially useful as a profile reshaping structure in a chromatographic column. For example, it is very economical to construct, highly resistant to elevated temperatures, can be shaped or cast in substantially any configuration desired, and can be made to have substantially any desired porosity, or to contain a porosity gradient which may range from impermeability to highly porous with the individual pores being of relatively large diameter.

The invention further comprehends the construction of the chromatographic column walls per se from the described highly useful artificial sandstone material, as well as the combination of columns having this type of wall construction with internally located consolidated particle matrices of the type described. In constructing both column walls and profile reshaping internal structure from the sandstone-like material, the dual advantage can be gained of reducing substantially the wall effect present in the column and simultaneously counteracting any profile distortion which does result, either from residual wall effect or other causes.

From the foregoing description of the invention, it will have become apparent that it is a major object of the present invention to provide improved chromatographic columns which are capable of achieving the separation of a mixture charged thereto into components, with less distortion of component concentration profiles resulting over the length of the column than has heretofore been characteristic of chromatographic columns.

Another object of the inventon is to provide structures adapted to be removably positioned in a chromatographic column, and functioning while positioned in the column, to reduce or eliminate undesirable distortion of the profile of component concentration bands moving through the column.

An additional object of the invention is to provide an improved internal, component profile reshaping structure for gas chromatography columns, which structure can be more economically manufactured than generally analogous structures previously known to the art of chromatography.

A further object of the invention is to provide an improved gas chromatography apparatus which includes an integrally formed column and component concentration profile reshaping structure which conjunctively function to permit more efficient component separation by the column.

Other objects and advantages in addition to those specifically mentioned above will become apparent as the following detailed description of the invention is read in conjunction with the accompanying drawings which illustrate the invention.

In the drawings:
FIGURE 1 is a vertical sectional view through a chromatographic column constructed in accordance with one embodiment of the present invention. In the drawing, the column has been broken along its length and parts removed to avoid illustration of well-understood and irrelevant details.

FIGURES 6–9 are schematic sectional views of portions of the chromatographic column illustrated in FIGURE 5 depicting the manner in which a component concentration profile is distorted and reshaped in passing into and through the column.

Figures 1, 3, 5:
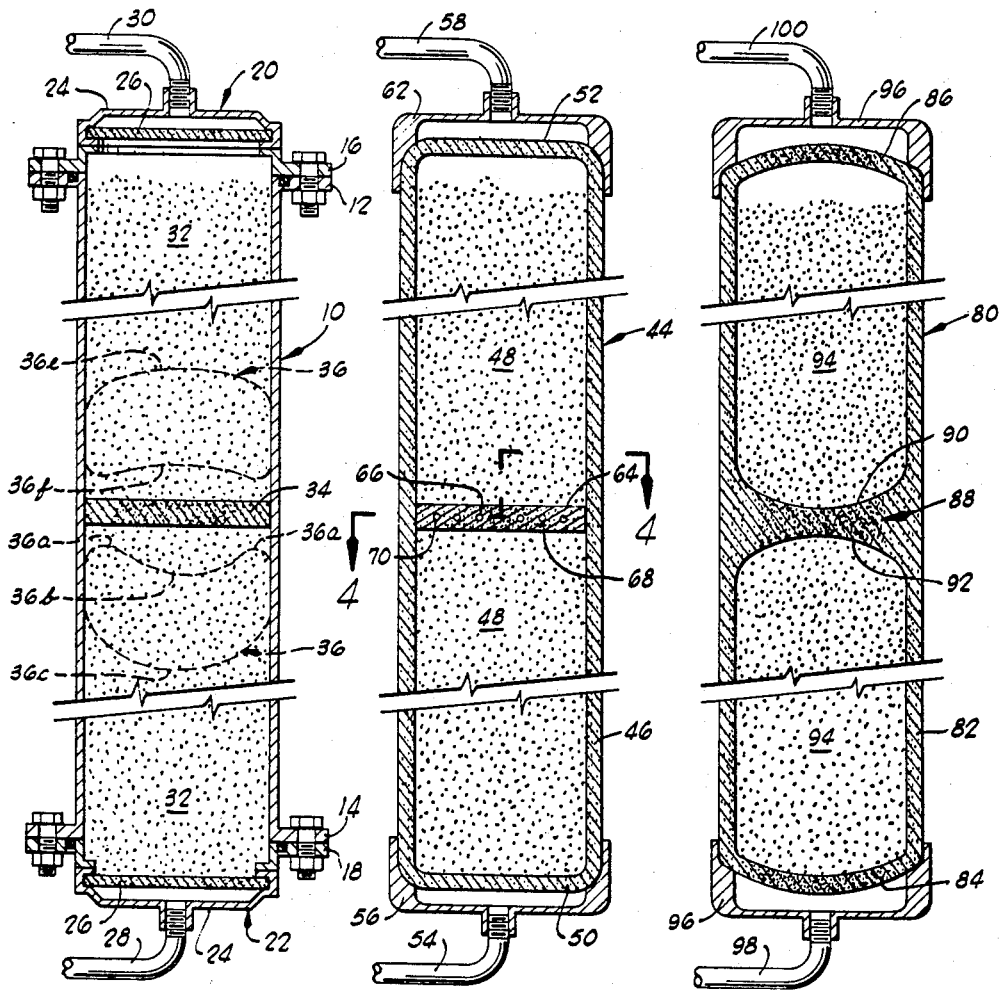
FIGURE 3 is a vertical sectional view similar to FIGURE 1, but illustrating a different aspect of the present invention.
FIGURE 5 is a vertical sectional view similar to FIGURES 1 and 3, but illustrating another embodiment of the invention.

Referring initially to FIGURE 1 of the drawings, a chromatographic column 10 constructed in accordance with one embodiment of the invention is illustrated. The column 10 is tubular in configuration and is provided at its upper and lower ends with connection flanges 12 and 14, respectively. The flanges 12 and 14 are secured by bolting or other suitable means to the flanges 16 and 18 of upper and lower sparger units designated generally by reference characters 20 and 22, respectively. Each of the sparger units includes a funnel-shaped member 24 and a porous disc 26 constructed of a rigid material, and functioning as described in co-pending United States application Ser. No. 304,103 filed Aug. 23, 1963, now U.S. Patent 3,354,619 issued Nov. 28, 1967, and assigned to the assignee of the present invention. An inlet conduit 28 is connected to the funnel-shaped member 24 of the lower sparger unit 22 for conveying a carrier gas and a sample mixture into the chromatographic column, and a discharge conduit 30 is similarly connected to the upper sparger unit 20.

It should be noted that, though sparger units 20 and 22 have been herein illustrated as one means which can be employed for connecting one end of the column 10 to a source of carrier gas and sample, the opposite end of the column to component analyzing or collecting devices, these units constitute no part of the present invention except as used in combination with other apparatus, and they may be replaced by other types of fittings or connections currently employed in chromatography technology for introducing and removing fluids from the ends of the column.

The column packing material employed in the column is a fine, particulate solid material 32 which may be a variety of substances whose requisite characteristics are well-understood in the art. The particulate solid material 32 may be coated with a relatively non-volatile, stationary liquid in which the components of a sample to be directed through the column are selectively adsorbed.

Positioned within the column packing material 32 between the ends of the column, and preferably near the center of the column is a component concentration profile reshaping structure 34. The profile reshaping structure 34, which will hereinafter be termed an internal, is disc-shaped in the embodiment of the invention illustrated in FIGURE 1 and extends completely across the column in a plane projecting substantially normal to the direction of gas flow through the column. The internal 34 is a permeable consolidated particle matrix through which gas moving along the column may flow. The internal 34 is formed by bonding a plurality of small solid particles to each other by the use of a suitable adhesive or bonding material which adheres to the particle surface at their point of contact with each other, yet does not plug or obscure the pores or channels through the internal.

In the construction of the internal 34, the permeability of the consolidated matrix is controlled to provide a predetermined permeability gradient across the internal in a direction extending normal to the axis of the column. This can be accomplished by selective positioning of the matrix particles in a molding or casting operation in the manufacture of the internal. Thus, if it is desired to provide higher permeability in the center of the disc shaped internal 34 than adjacent the outer periphery thereof (that is, adjacent the column wall), geometrically irregular, coarse particles are positioned in the center of the mold, and relatively fine, round or symmetrical particles are positioned adjacent the outer periphery of the unconsolidated matrix mass. The consolidating agent, such as an epoxy resin, sodium silicate, or the like is then allowed to cure or harden, and the result is a rigid internal which has a higher permeability, and therefore lower resistance to gas flow, at its center than at its peripheral edges. Virtually any type of permeability gradient can be made to characterize the internal 34, and this fact is used to permit the internal to be tailored to meet the requirements of particular types of component concentration profile distortion occurring within the column as hereinafter explained.

The internal 34 can be supported at the desired location in the column by any suitable means. Thus, it may be rested freely on the packing material 32 below it and retained in this position by the weight of the packing material above it, or it may be positively interlocked with, or secured to, the walls of the column. It should also be noted that, though the internal 34 is illustrated as disposed in contact with the packing material 32, it could also be located in an open space within the column if desired.

In considering the profile reshaping function of the internal 34, it will be helpful to assume that the illustrated embodiment of this structure is characterized in having a permeability gradient such that the highest permeability exists in the center of the internal, with a gradual reduction in permeability occurring in a radially outward direction from the center. As carrier gas and a fluid mixture of several distinct constituents are passed into the column through conduit 28, the separatory action of the packing material 32 resolves the mixture into two or more components. Each resolved component then moves through the column 10 as a band or zone of concentrated component in carrier gas, such bands each having a profile of the type illustrated in dashed lines in FIGURE 1. Two positions of the concentration profile are illustrated in FIGURE 1, one being the profile as it appears just before the component concentration zone reaches the internal 34, and the other being the profile as it appears after the component concentration zone has passed through the internal and is moving into the upper portion of the column.

Referring to the component concentration profile 36 developed in the lower portion of the column 10 and prior to the time that the component has reached the internal 34, it will be noted that the wall effect present in the column has caused the profile to become distorted so that it exhibits a concave leading edge having advanced portions 36a adjacent the column wall and a lagging or delayed portion 36b in the center of the column. The trailing edge 36c of the component concentration profile is convex in configuration also as a result of the wall effect. As the component concentration zone moves against and through the internal 34, those portions 36a of the component which are adjacent the column walls encounter a relatively great resistance to continued flow through the column by virtue of the lower permeability of the internal 34 in its radially outer portions as compared to its central portion. The central portion 36b of the concentration profile, however, contacts the more highly permeable central portion of the internal 34 and thus is permitted to move through the internal more rapidly than the radially outer portions of the profile. As a result of this permeability gradient in the internal 34, the component concentration profile 36 is reshaped by the internal, and upon emergence from the internal and movement into the upper end of the column 10 assumes a geometric configuration shown for the profile 36 as it is depicted in the upper portion of the column above the internal. Thus, the profile has been reshaped so that it has a convex leading edge 36e and a concave trailing edge 36f. This may be considered to be, in a sense, an over-compensation for the distorting influence of the wall effect in the upper portion of the column 10 since, as the component band continues to move upwardly in the column, the wall effect will slowly flatten both the leading edge 36e and the trailing edge 36f of the component concentration profile 36. Thus, with the attainment of substantially planar or flat leading and trailing edges in the component concentration profile 36, less overlap of the component bands may be expected to result, and the system approaches more nearly to the plug or planar flow which is recognized as the optimum characteristic of component concentration profile development in the column.

Figure 2:
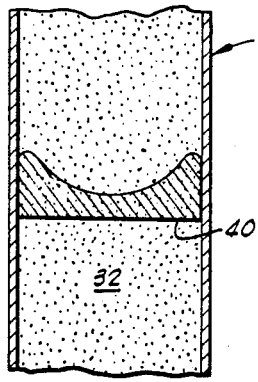
FIGURE 2 is a vertical sectional view through a portion of a chromatographic column illustrating one form of component concentration profile reshaping structure disposed therein and constructed in accordance with the present invention.

A different embodiment of the invention is illustrated in FIGURE 2 of the drawings. In this embodiment, the internal which is positioned within the column 10 is designated by reference character 40 and may be perceived to differ in its geometric configuration from the internal 34 appearing in the embodiment illustrated in FIGURE 1. By the use of the internal 40 in the chromatographic column 10, the counteracting of the distortion due to wall effect as previously explained in referring to FIGURE 1 can be accomplished primarily as a result of the geometric configuration of the internal, rather than its inclusion of a marked permeability gradient in a direction normal to the column axis. Thus, as a component concentration profile approaches the internal 40, it will have been distorted by the existing wall effect in the column so as to tend to have a concave front or leading edge, and a convex trailing edge. If the internal 40 has been constructed with the consolidated particle matrix having a uniform permeability which is in all instances substantially less than the permeability of the column packing 32, the components will, in general, move more slowly through the internal 40 than through the column packing. By making the radially outer portions of the internal 40 of thicker dimension than the centrally located portion of the internal, those portions of the component concentration profile adjacent the walls of the column can be retarded in their movement axially in the column relative to the portion of the component concentration profile in the center of the column. Thus, a reshaping action which is quite similar to the reshaping obtained by the use of the internal 34 in FIGURE 1 occurs when the internal 40 in FIGURE 2 is utilized.

It should be noted that another reshaping influence is also present in the arrangement depicted in FIGURE 2. This is the reshaping influence due to the adsorptive effect of the column packing, coupled with the geometric configuration imparted to the lower boundary of the packing in the upper portion of the column by the shape of the internal 40. The retarding effect of adsorption by the particles of packing on the gaseous components moving through the column will naturally be greater than will the retarding effect of solid particles which do not have any adsorptive capability, such as the neutral or inert particles used in the consolidated particle matrix of the internal 40. Thus, if it be assumed that the permeability of the internal 40 is uniform and is identical to that of the packing 32 in the column 10, then the effect of the use of the internal would be to aggravate the wall effect and make the concavity appearing at the leading edge of the concentration profile 36 more pronounced after passing through the internal than it is prior to reaching the internal. This would occur because after traversing the internal 40, the gases in the center of the component concentration profile would then be retarded more in their continued movement up the column by the adsorptive effect of the column packing than would be the radially outer components of the gas which were continuing to pass upwardly in the thicker, radially outer portions of the internal 40. In other words, where the reshaping influence of the packing-internal interface coupled with the retarding effect due to the adsorptive characteristic of the packing is alone to be relied upon for component concentration profile reshaping to overcome wall effect, the internal 40 should exhibit a convexity at its downstream surface rather than the concavity depicted in FIGURE 2, provided its permeability is matched to that of the column packing.

From the foregoing description of the invention, it will be apparent that, though illustrative embodiments of the invention have been illustrated, which for purposes of explanation of the action of the internals 34 and 40, have been intended primarily for employment in correction of the type of distortion resulting from wall effect, the internals 34 and 40 could be made of various geometric shapes, and could include various types of permeability gradients, in order to counteract substantially any type of component concentration profile distortion occurring in the column. Thus, for example, in the event of serious channeling in the central portion of the lower column packing resulting in marked fingering or advance of the portion of the gases in the center of the column with respect to the radially outer portions, an internal having exactly the opposite permeability gradient from that which characterizes the internal 34 in FIGURE 1 would be required. In other words, an internal to correct this type of distortion should offer the greatest resistance to the passage of gas therethrough at its center, and the least resistance to the passage of gas through its radially outer portions. The advanced finger of the component concentration profile toward the center of the column would then be retarded relative to the radially outer portions of the profile, and the profile would be flattened and returned more nearly to the optimum plug or planar front flow as a result of its passage through the internal. Similar counteraction of fingering resulting from channeling in the center of the column could be accomplished by selection of a proper geometric shape for the particular internal utilized.

Before proceeding to a description of other embodiments of the invention, it should be pointed out that in a preferred construction of the component concentration profile reshaping internals of the invention, the consolidated particle matrix is a material of the general type identified in United States Patents 3,146,828 and 3,146,829 issued to Robert L. Mann on Sept. 1, 1964. We have found that the siliceous cement material described in these patents possesses properties making it especially well adapted for the construction of the component concentration profile reshaping internals which have been described. Thus, it is highly temperature resistant (it can withstand temperatures of at least 500° F.), and thus can withstand the high temperatures at which many chromatographic columns are operated better than many other types of consolidated solid matrix materials. It can also be made water soluble so that upon completion of the use of the chromatographic column, it can be easily removed from the column by flushing the column with water. One of the most important properties, however, is the ease with which the siliceous cement can be molded or cast in substantially any desired geometric configuration, and the equal ease with which it can be made to possess a permeability gradient of substantially any type desired. In relation to the latter property, it should be noted that it can also be made to have complete impermeability to gas flow by a proper selection of the several components used in making up the parent suspension which is cast or molded, and is then permitted to set up to a hardened consolidated matrix.

Broadly described, this preferred composition utilized to prepare the internals employed in chromatographic columns in accordance with the invention comprises a solid, particulate, siliceous material, such as sand, in an amount of from about 40 to 80 weight percent, a sodium silicate ($Na_2O:SiO_2$) in an amount of from about 5 to about 25 weight percent, and water in an amount of from about 5 to about 30 weight percent. The composition may also include an inert solid suspending agent, such as silica flour or ground mica, etc., and from about 0.5 to about 6 weight percent of a stabilizing agent, such as zinc oxide, to make the consolidated particle matrix stable in the presence of water, if this property is desirable. In general, the compositions described in the cited patents are suitable for use in preparing internals used in this invention, and the teachings of the cited patents are incorporated herein by reference.

Another embodiment of the invention is illustrated in FIGURE 3 of the drawings. In this embodiment of the invention, the chromatographic column 44 is itself constructed entirely of the preferred consolidated particle matrix hereinbefore described. Thus, the tubular column wall 46 is prepared by initially making a suspension of sand in sodium silicate and water, pouring the suspension into a tubular mold and permitting it to set to a hardened state. The selective positioning of the sand particles in the mold permits the column wall 46 to be formed so that it is impermeable at its outer periphery, and gases are not permitted to escape from the column. Adjacent the internal surface of the wall 46, however, the sand particles are selected so as to match the particle size of a particulate packing material 48 used in the column, and a minimum of the bonding agent is utilized for adhering the particles in the matrix to each other at the internal surface of the column wall. Thus, under optimum molding conditions, the column wall can be constructed so that its internal surface is of the same particle size and porosity as the packing within the column adjacent the wall. This effectively reduces packing irregularities along the wall, and greatly reduces the tendency of the fluids flowing through the column to produce enlarged flow channels near the wall. The wall effect is therefore greatly suppressed.

The upper and lower ends of the column 44 depicted in FIGURE 3 are closed by integrally formed closure members or end plates 50 and 52 which, in the illustrated embodiment, are made uniformly permeable throughout, and facilitate the passage of gas introduced into, or removed from, the column by the inlet conduit 54 and its associated manifold cap 56, or by the discharge conduit 58 and its associated gas effluent collection cap 62, respectively.

An internal 64 is provided in about the center of the column 44 for the purpose of counteracting any component concentration profile distortion which occurs in the lower portion of the column. The internal 64 is, of course, a consolidated particle matrix of the type hereinbefore described, and is preferably constructed of the high temperature siliceous cement to which reference has also been made. The internal 64 is fabricated to have a permeability gradient across the column, and in the illustrated form has a greater permeability in the center of the column than adjacent the wall 46 thereof. This type of permeability gradient in the internal 64 will counteract any residual wall effect which may exist in the lower portion of the column 44, or any component concentration profile distortion resulting from any other characteristic of the column which tends to cause the portions of the profile adjacent the column wall to advance through the column faster than the portion of the profile in the center of the column.

Figure 4:
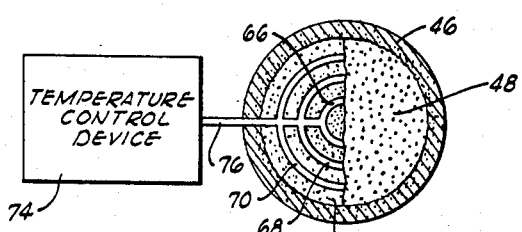
FIGURE 4 is a sectional view taken on line 4—4 of FIGURE 3.

The internal 64 depicted in FIGURE 3 is further characterized in having embedded in the consolidated particle matrix, a plurality of concentric, annular heating elements 66, 68 and 70 which are coaxially disposed in the column 44. The heating elements 66, 68 and 70 may be tubular members each enclosing a high resistance type electrical conductor, or, in some constructions, may be the electrical conductors themselves. Though not visible in FIGURE 3 of the drawings, a temperature control device 74, as schematically illustrated in FIGURE 4, can be positioned externally of the column 44 and connected to the heating elements 66, 68 and 70 by suitable electrical leads which are carried within a protective conduit 76. The temperature of each of the heating elements 66, 68 and 70 is individually controllable by the use of the temperature control device 74 in accordance with methods well-understood in the art so that the several heating elements 66–70 can be individually controlled, and can be heated to the same or different temperatures, as may be desired.

In almost all types of component concentration profile reshaping action which it is desired to procure by the use of the internal 64, the heating elements 66–70 will be individually heated to different temperatures to provide a thermal gradient across the column in a direction substantially normal to the direction of fluid flow therethrough. Thus, to provide an influence complementary to the reshaping influence of the permeability gradient which characterizes the internal 64, the radially innermost heating element 66 may be heated to a substantially higher temperature than the heating elements 68 and 70 so that the central portion of the internal 64 is at a higher temperature than the radially outer portions thereof. The provision of a thermal gradient of this type tends to counteract the wall effect since the molecules of the gases moving upwardly in the central portion of the column are then accelerated, and are caused to move more rapidly through the column than are the molecules of the gases adjacent the column walls. The lagging central portion of the profile can thus be made to overtake the advanced radially outer portions to reshape the component concentration profile in the direction of the desirable or optimum plug or planar flow hereinbefore described.

Yet another embodiment of the invention is illustrated in FIGURE 5 of the drawings. Here a chromatographic column 80 is constructed by casting of the preferred siliceous cement material hereinbefore described, and includes a tubular wall 82 having an impermeable outer skin and an inner surface which is matched to the porosity and particle size characteristics of the packing in the manner hereinbefore described. The column 80 further has a pair of concavely shaped permeable end plates or closure members 84 and 86, and a centrally located internal 88 having concave upper and lower surfaces 90 and 92, respectively. The tubular wall 82, closure members 84 and 86 and internal 88 are all cast integrally about the column packing material 94, or the end plates 84 and 86 may be positioned in a closing position at the ends of the column 80 after the packing material has been inserted therein on opposite sides of the internal 88. In the illustrated embodiment, the closure members 84 and 86 are constructed with a permeability gradient such that the central portion of each of the closure members is more permeable than the radially outer portions of each. A pair of fluid distributing manifolds 96 are provided at the opposite ends of the column 80 for introducing and receiving fluid into and from the column through the closure members 84 and 86, respectively. A carrier gas and sample introducing conduit 98 is provided at the lower end of the column 80, and an effluent discharge conduit 100 is provided at the upper end thereof, and these conduits communicate with the spaces defined between the respective distributing manifolds and the respective permeable closure members of the column.

The manner in which the column illustrated in FIGURE 5 functions in counteracting or preventing component concentration profile distortion is depicted in the schematic diagrams appearing in FIGURES 6–9. In FIGURE 6, as a mixture of gas to be separated into components is moved into the column 80 through the closure member 84 by the carrier gas, the portions of the mixture entering the packing material 94 adjacent the wall 82 of the column reach the packing particles later in time than does the portion of the gaseous mixture adjacent the axis or center of the column. This retarding of the radially outer portions of the gaseous mixture with respect to the central portion thereof is due to the greater permeability of the closure member 84 at its center than at its radially outer edges, and to the greater distance from the inlet conduit 94 to the wall 82 of the column 80 than to the packing in the center of the column. Thus, an initial concentration profile is established within the column 80 which is the opposite of the distorted profile tending to result from wall effect, and the leading edges of the component concentration bands 102 which commence to be developed by the adsorptive effect of the column packing 94 have a slightly convex configuration as shown in FIGURE 6.

Assuming next that the length of the column is such that, despite the desirable initial configuration of component concentraiton profiles developed in the manner shown in FIGURE 6, the profiles will tend to be inverted to the characteristic wall effect profile 104 shown in FIGURE 7 by the time the component concentration band has reached the center of the column near the internal 88, further corrective or reshaping action becomes necessary to restore the concentration profile to the desired plug or planar front flow which is optimum. Such reshaping of the profile is accomplished by the action of the internal 88. By constructing the internal 88 with a permeability gradient such that the permeability of the internal in the center of the column 80 is substantially greater than the permeability of this structure adjacent the wall 82 of the column, but less than the average permeability of the packing, the gas can flow through the central portion of the internal considerably more rapidly than it can flow through the radially outer portions thereof which are of lesser permeability. Also, the geometric configuration of the internal 88 assures that the time required for gases to reach the packing in the upper portion of the column 80 when proceeding through the radially outer portions of the internal will be substantially longer than the time required for the gases in the center of the concentration profile to reach this packing. Therefore, when the component band emerges from the internal 88 and continues to move upwardly in the packing in the upper portion of the column 80, it will have approximately the concentration profile 106 illustrated in FIGURE 8. Again it will be noted that this concentration profile 106 is the opposite of that which is engendered by the undesirable wall effect inherent in the column; that is, the leading edge of the profile is convex in configuration, and the trailing edge is concave in configuration.

Upon continued movement of the component concentration band toward the upper end of the column 80, the wall effect continues to act on the concentration profile with the result that the corrective reshaping action of the internal 88 is counteracted by the distorting wall effect until the component concentration profile appears as shown in FIGURE 9 adjacent the upper end of the column. Here it will be noticed that the concentration profile 108 has been distorted by the wall effect to the extent that a very slight concavity has developed in the leading edge, and a slight convexity has developed in the trailing edge of the profile. The final straightening of both leading and trailing edges is accomplished by the geometric configuration and permeability gradient characterizing the top closure member 86. Thus, by making the closure member 86 of greater permeability in the center thereof than at the radially outer periphery, and by providing a lesser permeability in the radially outer portions of the closure member than characterizes the column packing, the central portion of the component band is permitted to catch up with the radially outer portions thereof as the component band moves through the closure member. Both the leading and trailing edges of the concentration profile are straightened by the closure member 86 to an essentially monoplanar configuration, and the desired plug or planar front flow is achieved as the component emerges from the column.

It is to be noted that the principles of the invention broadly enunciated in referring to the several exemplary depicted embodiments can be utilized in a variety of structures not specifically described. Thus, for example, though the use of the several internals positioned within the column has been described in the context of counteracting or suppressing distortion due to wall effect, the internals can also be used with slight structural modifications to effectively counteract or eliminate profile distortion resulting from undesirable thermal gradients across the column, channeling and other distorting influences. It will also be apparent that in any of the internals herein illustrated, heat exchange elements may be embedded in the consolidated particle matrix in order to provide a concentration profile-influencing thermal gradient across the internal. The character of this gradient may be tailored to offset any particular type of distortion which may characterize a chromatographic column, and is used conjunctively with the permeability and geometric characteristics of the consolidated particle matrix of the internal to effect the desired corrective or reshaping action.

In summary, though several specific embodiments of the invention have been herein illustrated in order to provide examples of its practice sufficient to provide a guide for those skilled in the art, it is to be understood that a number of modifications in the illustrated structure can be effected without departure from the principles which permit the objects of the invention to be achieved. All such structural modifications are therefore deemed to be circumscribed by the spirit and scope of the invention except as the same may be necessarily limited by the appended claims or reasonable equivalents thereof.

What is claimed is:

1. Chromatography apparatus comprising:
   an elongated column having a fluid inlet and a fluid outlet;
   a permeable consolidated bonded-particle matrix extending transversely across the column spaced a substantial distance from said fluid inlet and said fluid outlet as measured along the axis of said column, said matrix being of a physical character such that the pressure drop of a fluid flowing therethrough is substantially less at a central region of said matrix than at a peripheral region thereof; and
   solid particulate packing material in contact with the transverse faces of said matrix in said column for selectively adsorbing components of a fluid mixture charged to the column.

2. The apparatus of claim 1 wherein said matrix is thicker at said peripheral region than at said central region.

3. Chromatography apparatus as defined in claim 1 wherein said permeable consolidated particle matrix comprises particles of sand bonded to each other by sodium silicate.

4. Chromatography apparatus as defined in claim 3 wherein said permeable consolidated particle matrix is a cast, hardened material constituting before casting, a stable water suspension comprising from about 5 to about 30 weight percent water, from about 5 to about 25 weight percent sodium silicate, and from about 40 to about 80 weight percent sand.

5. Chromatography apparatus as defined in claim 1 wherein said permeable consolidated particle matrix is further characterized in having a permeability gradient thereacross producing said pressure drop differential.

6. Chromatography apparatus as defined in claim 1 and further characterized to include heat exchange means imbedded in said consolidated particle matrix.

7. Chromatography apparatus as defined in claim 6 and further characterized to include temperature control means for selectively heating said heat exchange means to establish a thermal gradient across said matrix, said temperature control means being connected to, and spaced from, said heat exchange means for positioning said control means outside the packing-confining wall of the column.

8. Chromatographic apparatus as defined in claim 1 wherein said column is an impermeable consolidated particle matrix of tubular configuration formed integrally with said permeable consolidated particle matrix.

9. Chromatography apparatus as defined in claim 1 wherein said consolidated particle matrix is further characterized in having at least one side thereof of arcuate configuration.

10. In a chromatographic column of the type having fluid inlet and fluid outlet means, a confining wall between said fluid inlet and said fluid outlet, and solid particulate packing material confined by said wall, the improvement which comprises permeable consolidated bonded-particle matrix means extending across the column normal to the direction of fluid flow therethrough, spaced a substantial distance from each of said fluid inlet and said fluid outlet, said matrix means being in contact with said packing material at both its sides, and at least one of said sides being thicker at the peripheral region than at the central region and defining an arcuate boundary of a curvature such that the undesirable curvature of a component concentration profile is at least partially removed from a component band moving through the column by passage through said matrix means.

11. A chromatographic column comprising:
a tubular member of consolidated bonded-particle matrix material being porous at its internal surface and impermeable at its external surface;
a fluid inlet at one end of said tubular member and a fluid outlet at the other end of said tubular member;
a component concentration profile reshaping internal element in said tubular member spaced a substantial distance from each of said fluid inlet and said fluid outlet and extending across the direction of flow of fluid through said tubular member, said internal element being a permeable consolidated bonded-particle matrix of a physical character such that the pressure drop of a fluid flowing therethrough is substantially less at a central region thereof than at a peripheral region thereof; and
a particulate packing material confined in said tubular member over at least a portion of its length and contacting the internal surface of said tubular member and the faces of said internal element.

12. A chromatographic column as defined in claim 11 wherein said internal element is disc-shaped in configuration and has a diameter corresponding to the inside diameter of said column.

13. A chromatographic column as defined in claim 11 wherein said tubular member and internal element are integrally formed.

14. A chromatographic column as defined in claim 11 wherein said internal element is characterized in having a differential permeability across said tubular member to offer a varying resistance to gas flow through the column in the several parts of the cross-section of the tubular member at the location of the internal element therein.

References Cited

UNITED STATES PATENTS

| | | | |
|---|---|---|---|
| 3,135,107 | 6/1964 | Santeler | 55—197 X |
| 3,146,828 | 9/1964 | Mann | 106—84 X |
| 3,146,829 | 9/1964 | Mann | 106—84 X |
| 3,310,932 | 3/1967 | Melpolder | 55—386 |
| 3,315,736 | 4/1967 | Carel | 55—197 X |

FOREIGN PATENTS 1,009,160  11/1965  Great Britain.

OTHER REFERENCES

Scott, R. P. W.: "Gas Chromatography," 1960, Butterworths, London, England, 240–241, QD 271–I5

"A Note on Preparative Scale, Gas Chromatography," Journal of Chromatography, 9 (1962), 116–117, M. Verzelle.

REUBEN FRIEDMAN, *Primary Examiner.*

J. L. DeCESARE, *Assistant Examiner.*